UNITED STATES PATENT OFFICE.

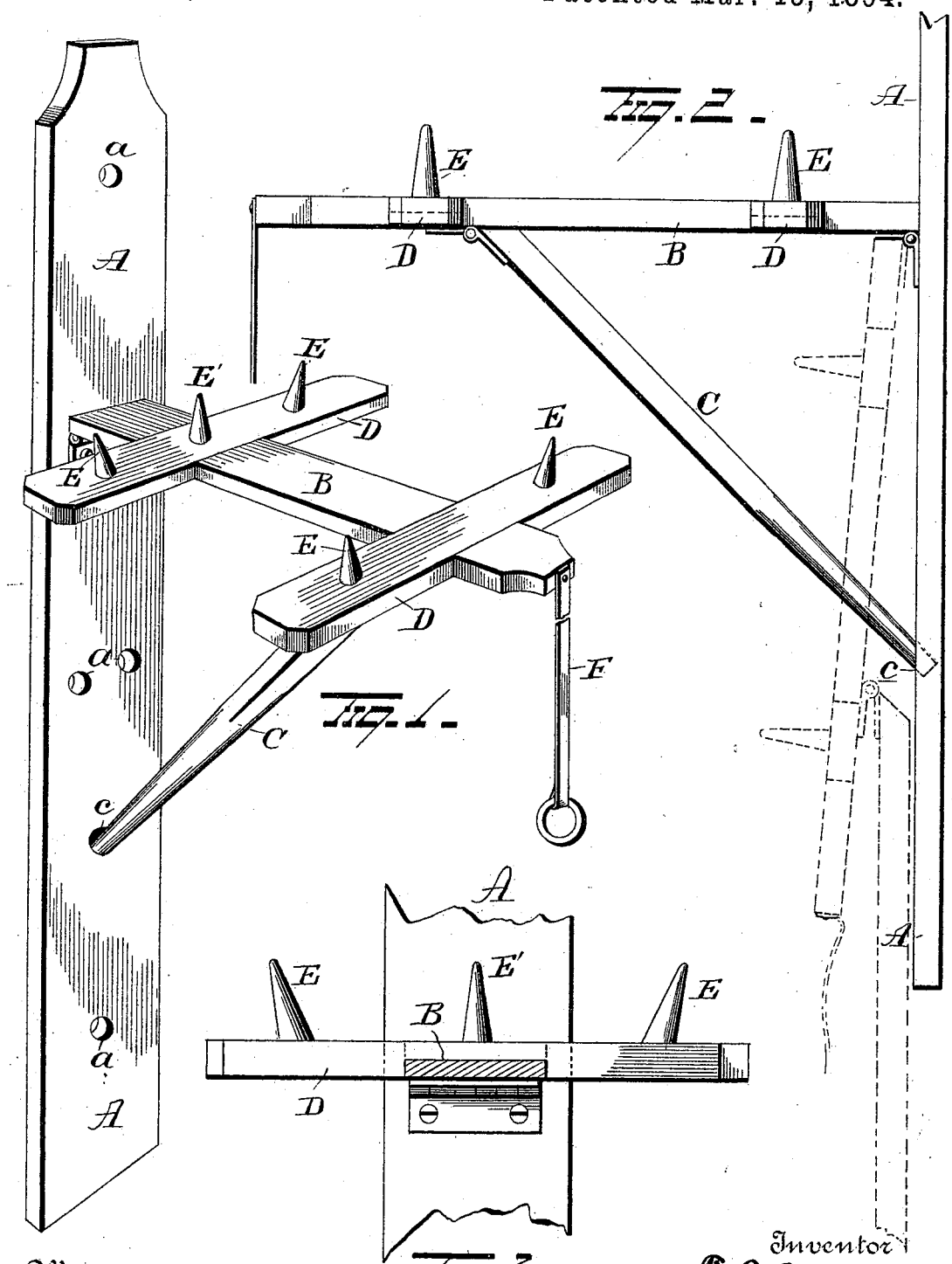

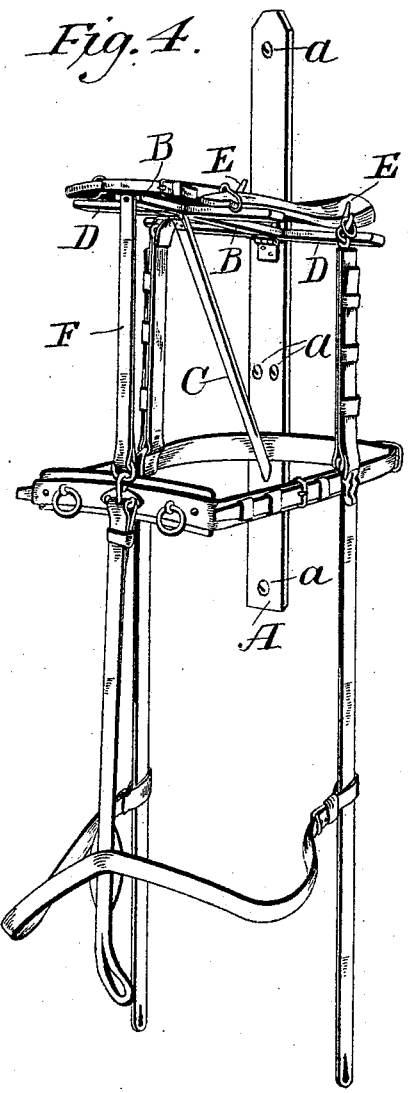

THOMAS C. MOORE, OF HANNIBAL, MISSOURI, ASSIGNOR OF ONE-HALF TO STEPHEN G. SMITH, OF SAME PLACE.

HARNESS-RACK.

SPECIFICATION forming part of Letters Patent No. 516,504, dated March 13, 1894.

Application filed March 15, 1893. Serial No. 466,083. (No model.)

*To all whom it may concern:*

Be it known that I, THOMAS C. MOORE, of Hannibal, in the county of Marion and State of Missouri, have invented certain new and useful Improvements in Harness-Racks; and I do hereby declare the following to be a full, clear, and exact description of the invention, such as will enable others skilled in the art to which it appertains to make and use the same.

My invention relates to an improvement in racks for displaying harness.

Heretofore harness have been hung up in harness shops or stores on a hook fastened to the side of the building or wall of the store and when so hung up, they hang in an unnatural position, which soon draws the harness out of shape and greatly injures their appearance and sale.

It is the object of my invention to obviate these objections and to provide a rack by means of which the harness may be spread out in a manner to advantageously display the harness to customers.

A further object is to so construct a rack that the harness will be supported in such manner as to prevent them from being drawn out of shape.

A further object is to produce a harness rack which shall be simple in construction, cheap to manufacture and effectual in the performance of its functions.

With these objects in view the invention consists in certain novel features of construction and combinations and arrangements of parts as hereinafter set forth and pointed out in the claims.

In the accompanying drawings: Figure 1 is a perspective view of my improved rack. Fig. 2 is a vertical sectional view. Fig. 3 is a transverse section of arm B. Fig. 4 is a view in perspective of the rack showing a harness in position thereon.

A represents an upright provided with a series of perforations $a$, for the accommodation of screws or other fastening devices, whereby to secure the device to the wall of the room or store.

At a point in proximity to the upper end of the upright A, an arm B is hinged, and at a point near the free end of said arm, a brace C is hinged. The free end of the brace C is preferably contracted somewhat and is adapted to enter a notch or recess $c$ in the upright A, whereby to maintain the arm B in a horizontal position when the device is in use. A series (preferably two) of cross bars or laterally projecting arms D, D, is secured to the arm B, and hooks E are secured to said arms in proximity to their ends. A hook E' is secured to the arm B at a point near its connection with the upright A. To the free end of the arm B, a strap F is secured.

When it is desired to place a harness on the rack, the arm B carrying the cross bars or laterally projecting arms D, is let down and the lower hame strap placed over the hook E'. The hames are then laid over the cross bars D outside the hooks E and the arm B raised to a horizontal position and the brace C placed in position in the notch or recess $c$. The strap F supports the back band of the harness, the check rein hook being fastened into it and the belly band is placed over the lower end of brace C and supported thereby.

A rack constructed and arranged as above set forth enables the dealer to display his harness in an advantageous position, without drawing it out of shape,—it is very simple in construction, cheap to manufacture and effectual in the performance of its functions.

Slight changes might be made in the details of construction of my invention without departing from the spirit thereof or limiting its scope and hence I do not wish to limit myself to the precise details of construction herein set forth, but, Having fully described my invention, what I claim as new, and desire to secure by Letters Patent, is—

1. A harness rack consisting of an upright constructed to be fastened to the wall or some vertical support, an arm hinged to this upright, a pair of laterally projecting arms secured to the hinged arm, said arms adapted to receive and support the hames of a harness, hooks or horns projecting upwardly around which the hames are placed, and a brace for supporting the hinged arm in an approximately horizontal position, substantially as set forth.

2. A harness rack, consisting essentially of a side plate constructed and adapted to be attached to some vertical support, an arm hinged to the side plate, laterally projecting arms secured to the hinged arm, hooks or horns projecting upwardly from one or more of the arms, a brace, and a strap connected with the outer or free end of the hinged arm for the support of the back band of a harness, substantially as set forth.

In testimony whereof I have signed this specification in the presence of two subscribing witnesses.

THOMAS C. MOORE.

Witnesses:
GEO. M. HARRISON,
S. A. BIRCH.